(12) United States Patent
Knock et al.

(10) Patent No.: US 12,277,570 B1
(45) Date of Patent: *Apr. 15, 2025

(54) SYSTEMS AND METHODS TO TRACK DISPLAY OF A DIGITAL CONTENT ITEM AND DISTRIBUTE REWARDS BASED ON THE DISPLAY

(71) Applicant: Watch Skins Corporation, San Juan, PR (US)

(72) Inventors: Collin Knock, San Juan, PR (US); Justin Knock, San Juan, PR (US)

(73) Assignee: Watch Skins Corporation, San Juan, PR (US)

( * ) Notice: Subject to any disclaimer, the term of this patent is extended or adjusted under 35 U.S.C. 154(b) by 109 days.

This patent is subject to a terminal disclaimer.

(21) Appl. No.: 18/172,050

(22) Filed: Feb. 21, 2023

Related U.S. Application Data

(63) Continuation of application No. 17/714,042, filed on Apr. 5, 2022, now Pat. No. 11,651,386.

(51) Int. Cl.

| | |
|---|---|
| *G06Q 30/02* | (2023.01) |
| *G06F 3/14* | (2006.01) |
| *G06Q 20/06* | (2012.01) |
| *G06Q 20/36* | (2012.01) |
| *G06Q 20/40* | (2012.01) |

(Continued)

(52) U.S. Cl.
CPC .......... *G06Q 30/0215* (2013.01); *G06F 3/14* (2013.01); *G06Q 20/0658* (2013.01); *G06Q 20/363* (2013.01); *G06Q 20/3678* (2013.01); *G06Q 20/401* (2013.01); *G06Q 30/0267* (2013.01); *G06Q 20/38* (2013.01)

(58) Field of Classification Search
CPC .......... G06Q 30/0215; G06Q 20/0658; G06Q 20/363; G06Q 20/3678; G06Q 20/401; G06Q 30/0267; G06Q 20/38; G06Q 30/0207–30/0277; G06F 3/14
See application file for complete search history.

(56) References Cited

U.S. PATENT DOCUMENTS

| 9,621,678 B1 | 4/2017 | Guastaferro |
| 10,373,158 B1 | 8/2019 | James |

(Continued)

FOREIGN PATENT DOCUMENTS

| JP | 2019083013 | 5/2019 |
| JP | 2019083013 A | 5/2019 |

(Continued)

OTHER PUBLICATIONS

PCT Search Report and Written Opinion for Application No. PCT/US23/015286, mailed Apr. 17, 2023 (10 pages).

(Continued)

*Primary Examiner* — Thuy N Nguyen
(74) *Attorney, Agent, or Firm* — Esplin & Associates, PC

(57) ABSTRACT

Systems and methods to track display of a digital content item and distribute rewards based on the display are disclosed. Exemplary implementations may receive a display request identifying the digital content item, effectuate display of the digital content item on a wearable device, receive display information associated with the display of the digital content item on the wearable device, determine and distribute rewards to the user in accordance with the display information, and/or perform other operations.

20 Claims, 3 Drawing Sheets

(51) Int. Cl.
*G06Q 30/0207* (2023.01)
*G06Q 30/0251* (2023.01)
*G06Q 20/38* (2012.01)

(56) References Cited

U.S. PATENT DOCUMENTS

| | | | |
|---|---|---|---|
| 10,427,045 | B2 | 10/2019 | Thompson |
| 10,540,653 | B1 | 1/2020 | James |
| 10,540,654 | B1 | 1/2020 | James |
| 10,546,326 | B2 | 1/2020 | Publicover |
| 10,565,616 | B2 | 2/2020 | Thompson |
| 10,565,623 | B2 | 2/2020 | Katz |
| 10,580,043 | B2 | 3/2020 | Publicover |
| 10,600,009 | B1 | 3/2020 | Augustine |
| 10,701,067 | B1 | 6/2020 | Ziraknejad |
| 10,708,042 | B1 | 7/2020 | Rubenstein |
| 10,936,647 | B2 | 3/2021 | Abuelsaad |
| 11,080,687 | B2 | 8/2021 | Vladi |
| 11,120,475 | B2 | 9/2021 | Katz |
| 11,127,048 | B2 | 9/2021 | Publicover |
| 11,133,936 | B1 | 9/2021 | Branton |
| 11,182,467 | B1 | 11/2021 | Medina |
| 11,200,569 | B1 | 12/2021 | James |
| 11,200,869 | B1 | 12/2021 | Post |
| 11,250,399 | B2 | 2/2022 | Knock |
| 11,263,607 | B2 | 3/2022 | Knock |
| 11,308,487 | B1 | 4/2022 | Foster |
| 11,316,691 | B2 | 4/2022 | Westland |
| 11,334,883 | B1 | 5/2022 | Auerbach |
| 11,341,451 | B2 | 5/2022 | Benayoun |
| 2002/0099452 | A1 | 7/2002 | Kawai |
| 2015/0025975 | A1* | 1/2015 | Wallach ............ G06Q 30/0266 705/14.62 |
| 2015/0213504 | A1* | 7/2015 | Katz ................. G06Q 30/0272 705/14.64 |
| 2015/0319161 | A1 | 11/2015 | Dimmick |
| 2016/0253710 | A1 | 9/2016 | Publicover |
| 2017/0201779 | A1 | 7/2017 | Publicover |
| 2017/0357426 | A1 | 12/2017 | Wilson |
| 2018/0091316 | A1 | 3/2018 | Stradling |
| 2018/0225660 | A1 | 8/2018 | Chapman |
| 2018/0308120 | A1* | 10/2018 | Cullen ............... G06Q 30/0241 |
| 2018/0310046 | A1* | 10/2018 | Cullen ................. H04W 12/06 |
| 2018/0331835 | A1 | 11/2018 | Jackson |
| 2019/0015747 | A1* | 1/2019 | Thompson ............... A63F 13/53 |
| 2019/0019218 | A1 | 1/2019 | Thompson |
| 2019/0172025 | A1 | 6/2019 | Riccardo |
| 2019/0220836 | A1 | 7/2019 | Caldwell |
| 2020/0005284 | A1 | 1/2020 | Vijayan |
| 2020/0090208 | A1* | 3/2020 | Reichenbach ......... G06Q 40/08 |
| 2020/0110814 | A1 | 4/2020 | Abuelsaad |
| 2020/0118068 | A1 | 4/2020 | Turetsky |
| 2020/0143426 | A1 | 5/2020 | Katz |
| 2020/0175485 | A1 | 6/2020 | Knock |
| 2020/0225655 | A1* | 7/2020 | Cella ................ G05B 19/41875 |
| 2020/0242105 | A1 | 7/2020 | Rich |
| 2020/0286119 | A1* | 9/2020 | Sullivan ............ G06Q 30/0242 |
| 2020/0297269 | A1 | 9/2020 | Riccardo |
| 2020/0320644 | A1* | 10/2020 | Hollis ................ G06Q 30/0222 |
| 2020/0327609 | A1 | 10/2020 | Dubrofsky |
| 2020/0348662 | A1 | 11/2020 | Cella |
| 2020/0349610 | A1 | 11/2020 | Publicover |
| 2020/0349611 | A1 | 11/2020 | Publicover |
| 2020/0374113 | A1 | 11/2020 | Noam |
| 2020/0380476 | A1 | 12/2020 | Trudeau |
| 2020/0393957 | A1 | 12/2020 | Wilson |
| 2021/0119785 | A1 | 4/2021 | Ben-Reuven |
| 2021/0157312 | A1 | 5/2021 | Cella |
| 2021/0201280 | A1 | 7/2021 | Knock |
| 2021/0248560 | A1 | 8/2021 | Rajendran |
| 2021/0256512 | A1* | 8/2021 | Mabrouki ........... G06Q 20/363 |
| 2021/0342822 | A1 | 11/2021 | Lau |
| 2021/0365948 | A1 | 11/2021 | Briscombe |
| 2021/0374807 | A1 | 12/2021 | Katz |
| 2022/0036405 | A1 | 2/2022 | Publicover |
| 2022/0075845 | A1 | 3/2022 | Bowen |
| 2022/0108262 | A1 | 4/2022 | Cella |
| 2022/0114567 | A1 | 4/2022 | Knock |
| 2022/0114600 | A1 | 4/2022 | Blackburn |
| 2022/0146822 | A1 | 5/2022 | El-Ghoroury |
| 2022/0150570 | A1* | 5/2022 | Weerasinghe ... H04N 21/47805 |
| 2022/0164815 | A1 | 5/2022 | Petersen |
| 2022/0207615 | A1 | 6/2022 | Naqvi |
| 2022/0261853 | A1 | 8/2022 | Publicover |
| 2022/0300966 | A1 | 9/2022 | Andon |
| 2022/0318847 | A1* | 10/2022 | Zenoff ..................... H04L 67/52 |
| 2022/0391888 | A1 | 12/2022 | Kim |
| 2023/0004125 | A1 | 1/2023 | Knock |
| 2023/0085677 | A1 | 3/2023 | Copeland |
| 2023/0101814 | A1 | 3/2023 | Knock |
| 2023/0108983 | A1 | 4/2023 | Vosseller |
| 2023/0274305 | A1* | 8/2023 | Yeung ................ G06Q 20/3678 705/66 |
| 2023/0297982 | A1 | 9/2023 | Knock |
| 2023/0297984 | A1 | 9/2023 | Knock |
| 2023/0351051 | A1* | 11/2023 | Woo ....................... G06Q 50/18 |
| 2023/0400816 | A1 | 12/2023 | Knock |

FOREIGN PATENT DOCUMENTS

| | | |
|---|---|---|
| JP | 2019096272 | 6/2019 |
| JP | 2019096272 A | 6/2019 |
| JP | 2020068388 | 4/2020 |
| JP | 2020068388 A | 4/2020 |

OTHER PUBLICATIONS

PCT Search Report and Written Opinion for Application No. PCT/US23/016753 mailed Apr. 24, 2023 (7 pages).
Thiago Bueno et al. Blockchain and Industry 4.0: Overview, Convergence, and Analysis. (Jan. 2020). 33 pages.
Tim Swanson. Great Chain of Numbers. A Guide to Smart Contracts, Smart Property and Trustless Asset Management. (2014) 130 pages.
United Nations Economic Commission for Europe, United Nations Centre for Trade Facilitation and Electronic Business. White Paper Blockchain in Trade Facilitation. (2020). 159 pages.
Thiago Bueno et al. "Blockchain and Industry 4.0: Overview, Convergence, and Analysis." (Jan. 2020). Retrieved online Jul. 6, 2022. https://www.researchgate.net/publication/338358883_Blockchain_and_Industry_40_Overview_Convergence_and_Analysis/ink/5f902b70299bf1b53e37affc/download (Year: 2020) 33 pages.
Tim Swanson. "Great Chain of Numbers. A Guide to Smart Contracts, Smart Property and Trustless Asset Management." (2014). Retrieved online Jul. 6, 2022. https://s3-us-west-2.amazonaws.com/chainbook/Great+Chain+of+Numbers+A+Guide+to+Smart+(Contracts%2C+Smart+Property+and+Trustless+Asset+Management+-+Ti (Year: 2014) 130 pages.
United Nations Economic Commission for Europe, United Nations Centre for Trade Facilitation and Electronic Business. "White Paper Blockchain in Trade Facilitation." (2020). Retrieved online Jul. 6, 2022. https://unece.org/DAM/trade/Publications/ECE-TRADE-457E_WPBlockchainTF.pdf (Year: 2020) 159 pages.

* cited by examiner

SYSTEMS AND METHODS TO TRACK DISPLAY OF A DIGITAL CONTENT ITEM AND DISTRIBUTE REWARDS BASED ON THE DISPLAY

FIELD OF THE DISCLOSURE

The present disclosure relates to tracking display of a digital content item and/or distributing rewards based on the display.

BACKGROUND

Digital content items associated with non-fungible and fungible tokens are known. Distributed ledgers are known techniques to produce a secure record or registry of ownership of assets, transactions, transfers of considerations, and/or other information. For example, a distributed blockchain is a distributed ledger. Different types of distributed ledgers are known.

SUMMARY

Companies may desire to pay individuals to promote their products and/or brand(s) through the use and/or wear of certain digital content items associated with the company. The nature of digital content items may present difficulties in determining accurate amounts of consideration for pay and/or the extent to which the product and/or brand was promoted. One or more aspects of the present disclosure aims to solve the presented problems by proposing a solution allowing companies to reward users for promotion using digital content items. Rewards to users may be based on the length of time the user displays the digital content item, the user's location during display of the digital content item, and/or other factors.

One or more aspects of the present disclosure includes a system configured to track display of a digital content item and distribute rewards based on the display. The system may include one or more hardware processors configured by machine-readable instructions and/or other components. Executing the machine-readable instructions may cause the one or more hardware processors to facilitate tracking display of the digital content item and/or distributing rewards based on the display. The machine-readable instructions may include one or more computer program components. The one or more computer program components may include one or more of a presentation component, a tracking component, a reward component, and/or other components.

The presentation component may be configured to receive, by a user via a client computing platform associated with the user, a display request. The display request may identify a digital content item, a wearable device associated with the user, and/or other information. The digital content item may be configured to be display on the wearable device. By way of non-limiting example, a first display request may identify a first digital content item, a first wearable device associated with a first user, and/or other information.

The presentation component may be configured to effectuate, responsive to receipt of the display request, display of the digital content item on the wearable device associated with the user. By way of non-limiting example, the first digital content item may be displayed on the first wearable device.

The tracking component may be configured to receive display information associated with display of the digital content item on the wearable device, and/or other information. The display information may characterize at least one of a duration of time the digital content item is displayed on the wearable device, a geographical location of the wearable device during display of the digital content item, observer interaction with the digital content item, and/or other information. By way of non-limiting illustration, first display information may be associated with the display of the first digital content item on the first wearable device.

The reward component may be configured to determine and/or distribute rewards to the user in accordance with the display information and/or other information. The rewards may include a transfer of consideration to an address on a decentralized ledger that corresponds to a user wallet associated with the user. By way of non-limiting example, a first amount of consideration may be transferred to an address on the decentralized ledger that corresponds to a first user wallet associated with the first user and/or the first amount of consideration may be in accordance with the first display information.

As used herein, any association (or relation, or reflection, or indication, or correspondency) involving servers, processors, client computing platforms, users, user accounts, digital content items, digital features, wearable devices, assets, requests, manners of usage, offers, transactions, ownership, decentralized ledgers, responses, denials, contracts, incentives, proposals, sets of instructions, operations, determinations, distributions, transfers, schemes, presentations, interfaces, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "receive" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any" effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
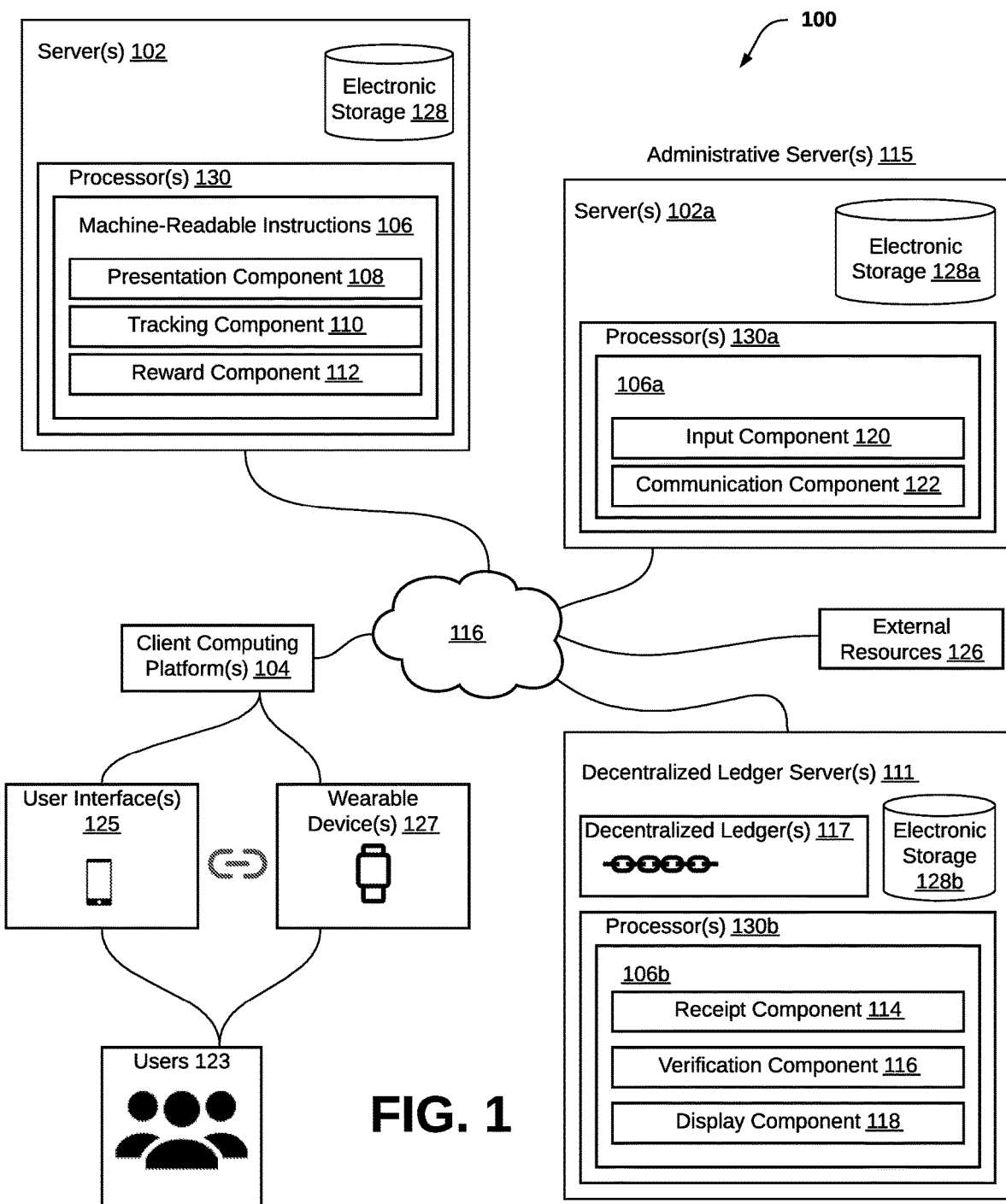
FIG. 1 illustrates a system configured to track display of a digital content item and distribute rewards based on the display, in accordance with one or more implementations.

FIG. 1 illustrates a system 100 configured to track display of a digital content item and distribute rewards based on the display, in accordance with one or more implementations. As used herein, the term "digital content item" may refer to a digital content item selected and/or created by a user. As used herein "identifier" may refer to a digital content item identifier that is unique to a particular digital content item. For example, in some implementations, an identifier or identifying information of a digital content item may include or be based on a combination of different types of information, including but not limited to information regarding the type of digital content item, the digital features, the values of digital features, an alphanumeric string (e.g., a serial number or other text string) or other human and/or machine readable identifier of the digital content item, and/or other types of information. As used herein ownership of a digital content item may be tracked, recorded, and/or otherwise registered on one or more decentralized ledgers.

System 100 may include one or more server(s) 102, decentralized ledger server(s) 111, administration servers 115, one or more client computing platform(s) 104, user interface(s) 125, one or more external resources 126, and/or other components. As used in descriptions herein, any use of the term "user" may refer to users 123. As used in description here, any use of the term "device" or "wearable device may refer to wearable devices 127. Electronic storage 128a and electronic storage 128b may be similar to electronic storage 128 as described elsewhere in this disclosure, though included in administration server(s) 115 and decentralized ledger server(s) 111, respectively, as depicted in FIG. 1.

Decentralized ledger server(s) 111 may be used to implement one or more decentralized ledger(s) 117. In some implementations, decentralized ledger(s) 117 may be maintained by distributed computing platforms (not shown in FIG. 1). In some implementations, a distributed computing platform may be implemented by a set of client computing platforms and/or servers (including, for example, one or more decentralized ledger server(s) 111). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of decentralized ledger(s) 117. The smart contracts may be stored on decentralized ledger(s) 117 and/or another decentralized ledger. In some implementations, the distributed computing platform may be the EOSIO platform. In some implementations, the distributed computing platform may be similar to or based on the EOSIO platform. In some implementations, the distributed computing platform may be Ethereum. In some implementations, the distributed computing platform may be similar to or based on Ethereum. In some implementations, the virtual machine may be a decentralized virtual machine.

In some implementations, at least one of the decentralized ledger(s) 117 implemented by decentralized ledger server(s) 111 is a private permissioned decentralized ledger. The private permissioned blockchain may be configured to record information. The recorded information may pertain to one or more digital content items recorded on decentralized ledger(s) 117. The recorded information may include ownership of the digital content items, transfers of consideration, and/or other information. User actions may effectuate modifications to the recorded information pertaining to the digital content items. For example, ownership rights and/or other rights may be modified. In some implementations, a digital content item may be removed from one decentralized ledger and added or recorded on another decentralized ledger. In some implementations, at least one of the decentralized ledger(s) 117 implemented by decentralized ledger server(s) 111 is a public decentralized ledger. The public decentralized ledger may be configured to be part of either EOSIO mainnet, Ethereum mainnet, Ethereum 1.5, Ethereum 2.0, a derivative of Ethereum 2.0 that is configured to perform transactions of Ether (ETH) between accounts, or a derivative of EOSIO that is configured to perform transactions of EOS between different accounts.

Elements of decentralized ledger(s) 117 ledger may be grouped together in units that are referred to as blocks and/or nodes. For example, an individual block may include one or more assets (e.g., digital content items) and/or one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets (e.g., digital content items), one or more transactions, and/or other information. As used herein, "an individual block including a digital content item" may refer to the individual block including a digital content item record and/or a digital content item identifier associated with the digital content item.

As depicted in FIG. 1, decentralized ledger server(s) 111 may include one or more of electronic storage 128b, processor(s) 130b, machine-readable instructions 106b, (node of) decentralized ledger(s) 117, and/or other components. Machine-readable instructions 106b may include one or more instruction components. The instruction components may include computer program components. The instruction components may include one or more of a receipt component 114, a verification component 116, a display component 118, and/or other instruction components. In some implementations, an individual decentralized ledger server(s) 111 may be dedicated to a particular node of a decentralized ledger(s) 117. Typically, different nodes are included in (or implemented by, or hosted by) different servers or different computer systems to increase the safety and security of transactions on a decentralized ledger and/or blockchain. The consensus protocol used for a particular blockchain will be harder to falsify or circumvent when the different nodes are in different geographical locations, on different types of computing platforms, and/or otherwise distributed and diverse.

In some implementations, one or more decentralized ledger(s) 117 implemented by decentralized ledger server(s) 111 may be publicly accessible. In some implementations, one or more decentralized ledgers implemented by decentralized ledger server(s) 111 may be private and/or permissioned. In some implementations, one or more decentralized ledger(s) 117 implemented by decentralized ledger server(s) 111 may be append-only. In some implementations, existing blocks and/or nodes of one or more decentralized ledger(s) 117 implemented by decentralized ledger server(s) 111 can substantially not be altered or deleted, unless multiple copies are altered. This is unlikely to happen provided that the multiple copies stored on different computing platforms, e.g., in different geographical locations, in accordance with the relevant consensus protocol(s). Decentralized ledger(s) 117 may be replicated on multiple computing platforms, preferably in multiple different geographical locations. Additionally, individual blocks and/or nodes may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, individual nodes, transactions, and/or assets may be digitally signed in a manner that proves integrity and/or prevents tampering, e.g., by providing authentication, as well as repudiation.

Server(s) 102 may be configured to communicate with one or more client computing platforms 104 according to a client/server architecture and/or other architectures. Client computing platform(s) 104 may be configured to communicate with other client computing platform(s) 104 via server(s) 102 and/or according to a peer-to-peer architecture and/or other architectures. User(s) 123 may access system 100 via client computing platform(s) 104. In some implementations, system 100 and/or decentralized ledger server(s) 111 may be configured to communicate with one or more of server(s) 102, users 123, and/or other entities and/or components, e.g., through one or more network(s) 116. In some implementations, client computing platform(s) 104 may be accessed through one or more user interface(s) 125. User interface(s) 125 is shown as a mobile device but may include one or more other computing devices. User interface(s) 125 may be linked and/or associated to one or more user device(s) 127. Wearable device(s) 127 may include a head mounted device, a portable electronic device (e.g., personal digital assistance (PDA)), a smart watch, and/or other devices. In some implementations, wearable device(s) 127 may refer to a physical device (e.g., a smart watch) or a virtual wearable device within a virtual reality environment. A virtual wearable device may be worn by a virtual representation of the user (i.e., an avatar) and/or be capable of displaying digital content within the virtual reality environment. User interface(s) 125 may be linked and/or associated to user device(s) 127 through wireless connection (e.g., Bluetooth pairing), wired connection, and/or other pairing methods.

Server(s) 102 may include electronic storage 128, processor(s) 130, machine-readable instructions 106, and/or other components. Server(s) 102 may be configured by machine-readable instructions 106. Machine-readable instructions 106 may include one or more instruction components. The instruction components may include computer program components. The instruction components may include one or more of a presentation component 108, a tracking component 110, a reward component 112, and/or other instruction components. Processor(s) 130a and processor(s) 130b may be similar to processor(s) 130 as described elsewhere in this disclosure, though included administration server(s) 115 and decentralized ledger server(s) 111, respectively, as depicted in FIG. 1. Machine-readable instructions 106a and machine-readable instructions 106b may be similar to machine-readable instructions 106 as described elsewhere in this disclosure, though included in administration server(s) 115 and decentralized ledger server(s) 111, respectively, as depicted in FIG. 1.

Presentation component 108 may be configured to receive, by a user via a client computing platform associated with the user, a display request. The display request may identify a digital content item, a wearable device associated with the user, and/or other information. By way of non-limiting example, a first display request may identify a first digital content item, a first wearable device associated with a first user, and/or other information.

The digital content items may include a digital watch face, a digital object, an image, a video, a sound file, a text file, and/or other types of digital content items. The display request may identify the digital content item via a digital content item identifier and/or other types of identifiers. The digital content item identifier may be unique to the digital content item. The identifier may include an alphanumeric string (e.g., a serial number or other text string) or other human and/or machine-readable identifier of the digital content item and/or other information. The identifier may be based on the values of digital features, the time the digital content item was minted, the day the digital content item was minted, and/or other information. For example, a first digital content item may have a first digital content item identifier of '001', a second digital content item may have a second digital content item identifier of '002', a third digital content item may have a third digital content item identifier of '003', and so on and so forth. The first second, third digital content item identifiers and/or other digital content item identifiers may be unique, such that no two digital content item identifiers are the same. In some implementations, the digital content item identifier may indicate an owner history for the associated digital content item. For example, the digital content item identifier may include ownership information. Ownership information may indicate and/or identify a first owner, a second owner, a current owner, and/or other owners.

In some implementations, the display request may be submitted via user interface(s) 125, client computing platform(s) 104, and/or other components of system 100. The user interface(s) 125 may be presented on and/or embedded within wearable device(s) 127 and/or the wearable device indicated by the display request. In some implementations, the display request may automatically indicate a wearable device, responsive to the display request being submitted via a user interface included within the wearable device. In some implementations, the display request may indicate a wearable device, responsive to the display request being submitted via a user interface not included within the wearable device. The indicated digital content item may be compatible with one or more types of wearable devices and/or incompatible with one or more other types of wearable devices. For example, a display request indicating an incompatible type of wearable device for display of the digital content item may be denied and/or not received by presentation component 108.

The digital content item may be configured to be displayed (e.g, streamed, viewed, etc.) on the wearable device. In some implementations, the display request may indicate a duration of time for display and/or other information. Display of the digital content item may be terminated after the indicated duration of time. Responsive to the display request not indicating a duration of time for display, the digital content item may be displayed on the wearable device indefinitely and/or until the user requests termination of display. The digital content item may be reconfigured (i.e., resized, reshaped, etc.) to optimize display of the digital content item on the wearable device indicated by the display request. For example, the digital content item may be reconfigured to fit the shape of a display screen on the wearable device. The digital content item may be reconfigured based on the size, shape, resolution, and/or other factors related to the display screen and/or the wearable device.

Presentation component 108 may be configured to effectuate, responsive to receipt of the display request, display of the digital content item on the wearable device associated with the user. The digital content item may be displayed on a display screen of the wearable device indicated by the display request and/or other wearable devices. Display of the digital content item may include streaming of visual and/or audio components included in the digital content item. The display screen may be capable of detecting user input. The user input may indicate user interaction with the digital content item and/or other content. User input may include tapping, double-tapping, swiping, touching, and/or other interactions with the display screen of the wearable device and/or other component of the wearable device. User input may further include scanning and/or opening, via another device, a quick response (QR) code included in the digital content item and/or displayed on the wearable device.

In some implementations, display of the digital content item on the wearable device associated with the user may be permitted responsive to the user having ownership of the digital content item. Receipt component 114 may be configured to receive the display request to display the digital content item on the wearable device. The display request may indicate user(s) 123 trying and/or wanting to display the digital content item on the wearable device. In some implementations, user 123 may submit a display request through interacting with one or more user interface(s) 125, interacting with one or more devices with user device(s) 127, and/or other ways. The display request may indicate the specific digital content item (e.g., using the digital content item identifier), a user associated with the device, a user wallet associated with the user, an address on decentralized ledger(s) 117 associated with the user wallet, and/or other information.

In some implementations, verification component 116 may be configured to, responsive to receiving the display request, determine whether the user wallet for a decentralized ledger(s) 117 holds a non-fungible token associated with the specific digital content item. In some implementations, determining whether the user wallet holds a non-fungible token may include determining if the non-fungible token is recorded at the address associated with the user wallet on decentralized ledger(s) 117. In some implementations, the address associated with the user wallet may hold one or more tokens (i.e., the user owns one or more digital content items). The non-fungible token may be recorded on a smart contract and/or other executable code. Responsive to the non-fungible token being recorded at the address associated with the user wallet on decentralized ledger(s) 117, determine if the non-fungible token indicates the digital content item identifier associated with the digital content item. In some implementations, the digital content item identifier may be included in the display request. Responsive to the non-fungible token indicating the digital content item identifier associated with the digital content item, a determination may be made that the user has ownership of the digital content item. Responsive to the non-fungible token not indicating the digital content item identifier associated with the digital content item, a determination may be made that the user does not have ownership of the digital content item. In some implementations, verification component 116 may be configured to obtain digital content item rights (e.g., ownership rights, distribution rights, licensing rights, and/or other rights) for a particular digital content item, responsive to the user having ownership of the particular digital content item. In some implementations, verification component 116 may be configured to access decentralized ledger(s) 117 to obtain the digital content item rights (that are recorded on decentralized ledger(s) 117, e.g., in one or more smart contracts).

In some implementations, presentation component 108 and/or display component 118 may be configured to, responsive to the user wallet holding the non-fungible token associated with the digital content item, facilitate display of the digital content item on the wearable device. Facilitating display of the digital content item may include initiating transmission of information to the device that causes the wearable device to display the digital content item.

Tracking component 110 may be configured to receive display information associated with display of the digital content item on the wearable device, and/or other information. The display information may characterize at least one of a duration of time the digital content item is displayed on the wearable device, a geographical location of the wearable device during display of the digital content item, observer interaction with the digital content item, and/or other information. The duration of time the digital content item is displayed may be defined by a start time when display of the digital content item is initiated and/or an end time when display of the digital content item is terminated. The display of the digital content item may be terminated responsive to user interaction with user interface(s) 125 and/or wearable device(s) 127 indicating termination. The display of the digital content item may be terminated automatically responsive to the display request indicating a specific duration of time for display of the digital content item. For example, the user may request display of the digital content item for 1 hour, 2 hours, 12 hours, and/or other durations of time.

The geographical location of the wearable device during display of the digital content item may include relative geographical locations, absolute geographical locations, micro-geographical locations, and/or other types of geographical locations. The relative geographical location of the wearable device may be based on a landmark, another wearable device, a location for an event, and/or other objects. The absolute geographical location of the wearable device may be a city, a building, a set of coordinates, and/or other types of locations. In some implementations, display information defining the geographical location of the wearable device may include information pertaining to crowd density, weather conditions, elevation, and/or other factors related to the geographical location of the wearable device.

The observer interaction with the digital content item may include the user's interaction with the digital content item and/or other observers' interaction with the digital content item. The observer interaction may include a number of times the user and/or other observers interacts with the digital content item and/or a frequency of interaction. For example, display information may indicate that the digital content item includes a QR code and the QR code has been scanned a number of times by other users (besides the user associated with the wearable device). Interaction may include the user and/or observer interacting with the wearable device, a display screen of the wearable device, and/or other components of the wearable device.

Reward component 112 may be configured to determine and/or distribute rewards to the user in accordance with the display information and/or other information. The determination of rewards may be based on the duration of time the digital content item was displayed, the geographical location of the wearable device during display, observer interaction with the digital content item, and/or other information. The amount of rewards determined may be proportional to one or more components of the display information and/or other information. For example, reward component may determine a first reward responsive to a digital content item being display for a first duration of time and a second reward responsive to the digital content item being displayed for a second duration of time. The first reward may be higher than the second reward responsive to the first duration may be longer than the second duration. The determination of rewards may be based on the digital content item, the wearable device, the user, and/or other information. For example, display of a first digital content item may result in a higher reward than a second digital content item being displayed for the same duration of time.

In some implementations, the determination of rewards may be based on a reward scheme and/or other information. The reward scheme may be associated with at least one of the digital content item, the user, and/or other information. The reward scheme may be unique to a digital content item, a user, and/or other information. For example, a first reward scheme may be associated with a first user and/or may not be associated with any other user. The reward scheme may indicate rewards to be based on at least one of a duration of time the digital content item is displayed, a geographical location of the wearable device during display of the digital content item, observer interaction with the digital content item via the wearable device, and/or other information. By way of non-limiting example, a first reward scheme may indicate a first reward to be distributed to the first user subsequent to display of the digital content item on the first wearable device for a first duration of time. One or more reward schemes may indicate amounts of rewards (i.e., consideration) distributed for display of the digital content item for a duration of time, at a geographical location, achieving a threshold of observer interaction, and/or other factors.

The rewards may include a transfer of consideration to an address on decentralized ledger 117 that corresponds to a user wallet associated with the user 123. The rewards may be transferred from an address on decentralized ledger 117 that corresponds to an administrative wallet and/or other wallets. In some implementations, the transfer of consideration to the address on decentralized ledger 177 that corresponds to the user wallet associated with user 123 may include a transfer fee, a gas fee, and/or other kinds of fees. By way of non-limiting example, a first amount of consideration may be transferred to an address on the decentralized ledger that corresponds to a first user wallet associated with the first user and/or the first amount of consideration may be in accordance with the first display information. In some implementations, the consideration may include at least on of cryptographic currency, cryptographic tokens, supplemental digital content, and/or other types of consideration. In some implementations, supplemental digital content may be rewarded to the user by transferring a fungible or non-fungible token to the address on decentralized ledger 117 that correspond to the user wallet associated with user 123. The fungible or non-fungible token may identify the supplemental digital content rewarded to the user and/or permit access to the supplemental digital content. The supplemental digital content may be a second digital content item, may be added to the first digital content item (i.e., badge, filter, icon, text, etc.), and/or other types of digital content.

In some implementations, determination and distributions of rewards may be executed by a smart contract stored on the decentralized ledger 117 and/or other ledgers. Execution of the smart contract may be initiated by termination of display of the digital content item and/or other actions by user(s) 123 and/or within system 100. The smart contract may be associated with at least one of the digital content item and/or the user. In some implementations, the smart contract may be stored on decentralized ledger 117 at the address corresponding to the user wallet associated with the user 123 and/or other addressed on decentralized ledger 117. The smart contract may receive display information through one or more third-party oracles, and/or other types of oracles. The smart contract may receive display information from the oracle via networks 116, electronic storage 128, and/or other components. The oracle may be a trusted oracle and/or may be included in server(s) 102, tracking component 110, and/or other components of system 100. In some implementations, the oracle may be used to transfer display information from tracking component 110 to decentralized ledger(s) 117 and/or may be used to obtain the display information regarding display of the digital content item.

In some implementations, rewards may be determined and distributed to the user in an ongoing manner during display of the digital content item. For example, rewards may be determined and/or distributed every 30 seconds, 1 minute, 5, minutes, 10 minutes, and/or other intervals of time. In some implementations, rewards are determined and distributed to user subsequent to termination of display of the digital content item.

In some implementations, the user wallet may be linked to an external wallet. The external wallet may allow the user to store and manage funds on a public decentralized ledger(s) 117. The public decentralized ledger(s) 117 may be part of either EOSIO mainnet, Ethereum mainnet, Ethereum 1.5, Ethereum 2.0, a derivative of Ethereum 2.0 that is configured to perform transactions of Ether (ETH) between accounts, a derivative of EOSIO that is configured to perform transactions of EOS between different accounts, and/or other distributed computing platforms. In some implementations, funds may be transferred from the linked external wallet to the user wallet. Funds transferred from the linked external wallet to the user wallet may be in units of dollars (USD), euros (EUR), Bitcoin (BTC), Ethereum (ETH), Tether (USDT), Dogecoin (DOGE), and/or other currencies. Transferring funds from the external wallet to the user wallet may include a transfer fee, a gas fee, and/or other kinds of fees. The funds transferred and/or stored in the user wallet may be used within system 100 (e.g., to buy a digital content item). In some implementations, the user wallet may store funds from transactions made within system 100 (e.g., from selling a digital content item). In some implementations, funds stored in the user wallet may only be used for transactions on decentralized ledger(s) 117 (e.g., buying, selling, or transferring digital content items). Funds stored in the user wallet may be transferred to the external wallet to be used for transactions on decentralized ledgers outside of system 100 (e.g., buying, selling, or transferring other digital and/or non-digital assets).

Input component 120 may be configured to receive user input from administrative users. For example, the user input may include entry and/or selection of particular information, digital content items, values of digital content items, reward schemes, and/or any entity or object that interacts with any part of system 100 and/or plays a part in the operation of system 100. For example, an administrative user may select a particular set of digital content item designs and/or values of digital features as the input for other components of system 100, such as presentation component 108. Additionally, the administrative user may select a particular adjustment to be displayed by presentation component 108 (e.g., increase the cost of one or more values of digital features).

Communication component 122 may be configured to facilitate communication and/or interaction between administration server 115 and the rest of system 100. For example, communication component 122 may communicate user input received by input component 120 to other components of system 100.

Referring to FIG. 1, user interface(s) 125 may be configured to facilitate interaction between users 123 and system 100 and/or between users 123 and client computing platform(s) 104. In some implementations, user interface(s) 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interface(s) 125 may be included in one or more client computing platform(s) 104. In some implementations, one or more user interfaces 125 may be included in system 100. In some implementations, user interface(s) 125 may be a type of interface that facilitates the exchange of virtual items between users.

Referring to FIG. 1, in some implementations, server(s) 102, client computing platform(s) 104, administration server(s) 115, decentralized ledger server(s) 111, and/or external resources 126 may be operatively linked via one or more electronic communication links. For example, such electronic communication links may be established, at least in part, via one or more network(s) 116 such as the Internet and/or other networks. It will be appreciated that this is not intended to be limiting, and that the scope of this disclosure includes implementations in which server(s) 102, client computing platform(s) 104, administration server(s) 115, decentralized ledger server(s) 111, and/or external resources 126 may be operatively linked via some other communication media.

A given client computing platform 104 may include one or more processors configured to execute computer program components. The computer program components may be configured to enable an expert or user associated with the given client computing platform(s) 104 to interface with system 100 and/or external resources 126, and/or provide other functionality attributed herein to client computing platform(s) 104. By way of non-limiting example, the given client computing platform(s) 104 may include one or more of a desktop computer, a laptop computer, a handheld computer, a tablet computing platform, a NetBook, a Smartphone, a gaming console, and/or other computing platforms.

Administration server(s) 115 may include one or more of server(s) 102a, processor(s) 130a, machine-readable instructions 106a, electronic storage 128a, and/or other components. Server(s) 102a may be configured by machine-readable instructions 106a. Machine-readable instructions 106a may include one or more instruction components. The instruction components may include one or more of input component 120, communication component 122, and/or other instruction components. Administration server(s) 115 may include communication lines, or ports to enable the exchange of information with a network and/or other computing platforms. In some implementations, administration server(s) 115 may be used by one or more administrative users, e.g., to configure and/or control operation of system 100. In some implementations, administrative server(s) 115 may include or user one or more user interfaces to receive user input and/or otherwise interact with one or more administrative users. In some implementations, the one or more administrative user may be able to modify the reward schemes, modify determined amounts of rewards, and/or make other modifications. In some implementations, the one or more administrative users may be able to make transactions of consideration and/or value from and/or to the administrative wallet.

External resources 126 may include sources of information outside of system 100, external entities participating with system 100, external providers of computation and/or storage services, and/or other resources. In some implementations, some or all of the functionality attributed herein to external resources 126 may be provided by resources included in system 100. In some implementations, external resources 126 may include one or more blockchain oracles.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 116, 118, 120, and/or 122, and/or other components. Processor(s) 130 may be configured to execute components 108, 110, 112, 114, 116, 118, 120, and/or 122, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 122 are illustrated in FIG. 1 as being implemented within a single processing unit, in implementations in which processor(s) 130 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 130 may be configured to execute one or more additional components that may perform some or all of the functionality attributed below to one of components 108, 110, 112, 114, 116, 118, 120, and/or 122.

Figure 2:
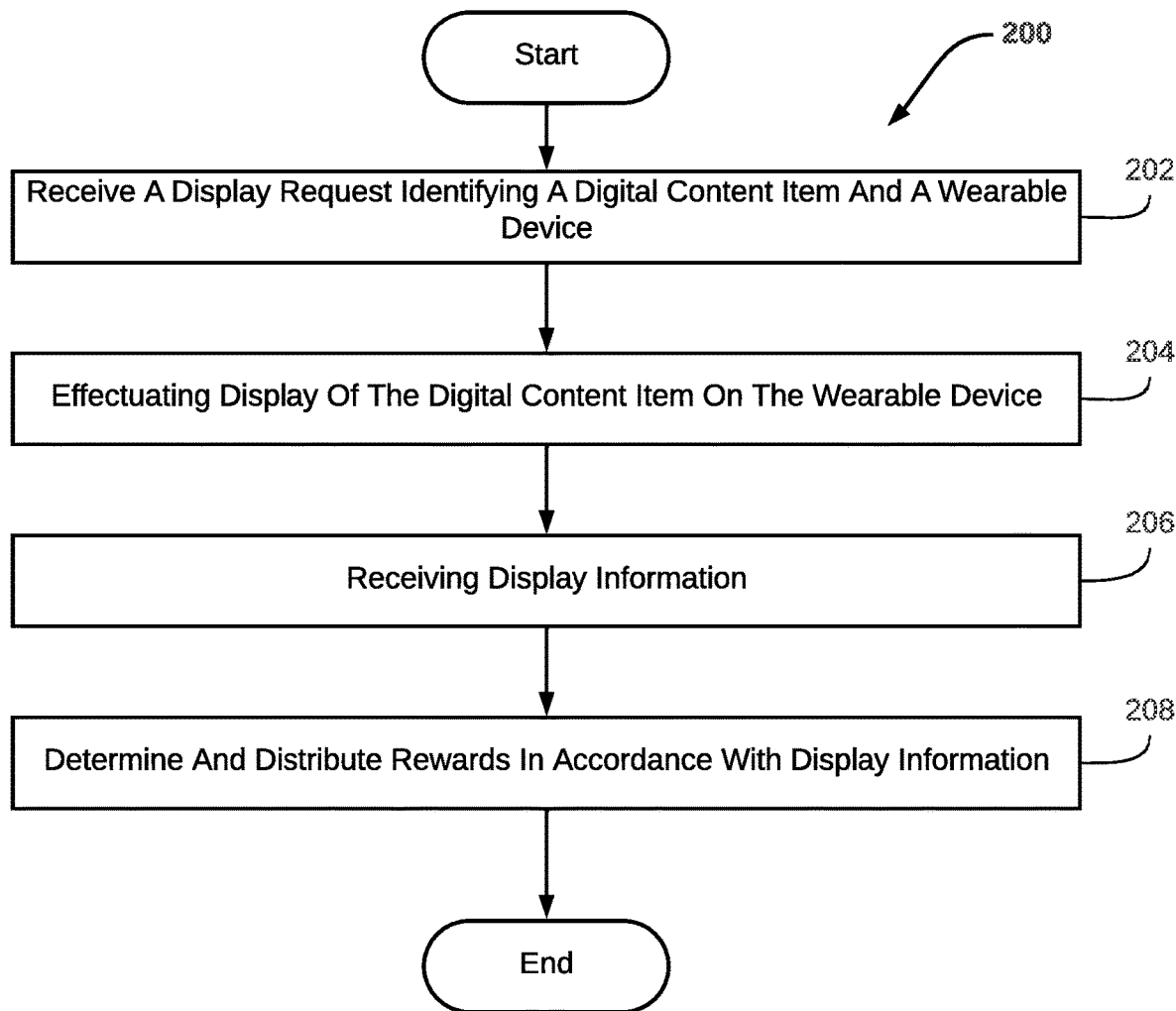
FIG. 2 illustrates a method to track display of a digital content item and distribute rewards based on the display, in accordance with one or more implementations.

FIG. 2 illustrates a method 200 to track display of a digital content item and distribute rewards based on the display, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving, by a user via a client computing platform associated with the user, a display request. The display request may identify a digital content item, a wearable device associated with the user, and/or other information. The digital content item may be configured to be display on the wearable device. By way of non-limiting example, a first display request may identify a first digital content item, a first wearable device associated with a first user, and/or other information. Operation 202 may be performed by a presentation component that is same as or similar to presentation component 108 (shown in FIG. 1 and described herein).

An operation 204 may include effectuating, responsive to receipt of the display request, display of the digital content item on the wearable device associated with the user. By way of non-limiting example, the first digital content item may be displayed on the first wearable device. Operation 204 may be performed by a presentation component that is same as or similar to presentation component 108 (shown in FIG. 1 and described herein).

An operation 206 may include receiving display information associated with display of the digital content item on the wearable device, and/or other information. The display information may characterize at least one of a duration of time the digital content item is displayed on the wearable device, a geographical location of the wearable device during display of the digital content item, observer interaction with the digital content item, and/or other information. By way of non-limiting illustration, first display information may be associated with the display of the first digital content item on the first wearable device. Operation 206 may be performed by a tracking component that is same as or similar to tracking component 110 (shown in FIG. 1 and described herein).

An operation 208 may include determining and distributing rewards to the user in accordance with the display information and/or other information. The rewards may include a transfer of consideration to an address on a decentralized ledger that corresponds to a user wallet associated with the user. By way of non-limiting example, a first amount of consideration may be transferred to an address on the decentralized ledger that corresponds to a first user wallet associated with the first user and/or the first amount of consideration may be in accordance with the first display information. Operation 208 may be performed by a reward component that is same as or similar to reward component 112 (shown in FIG. 1 and described herein).

Figure 3:
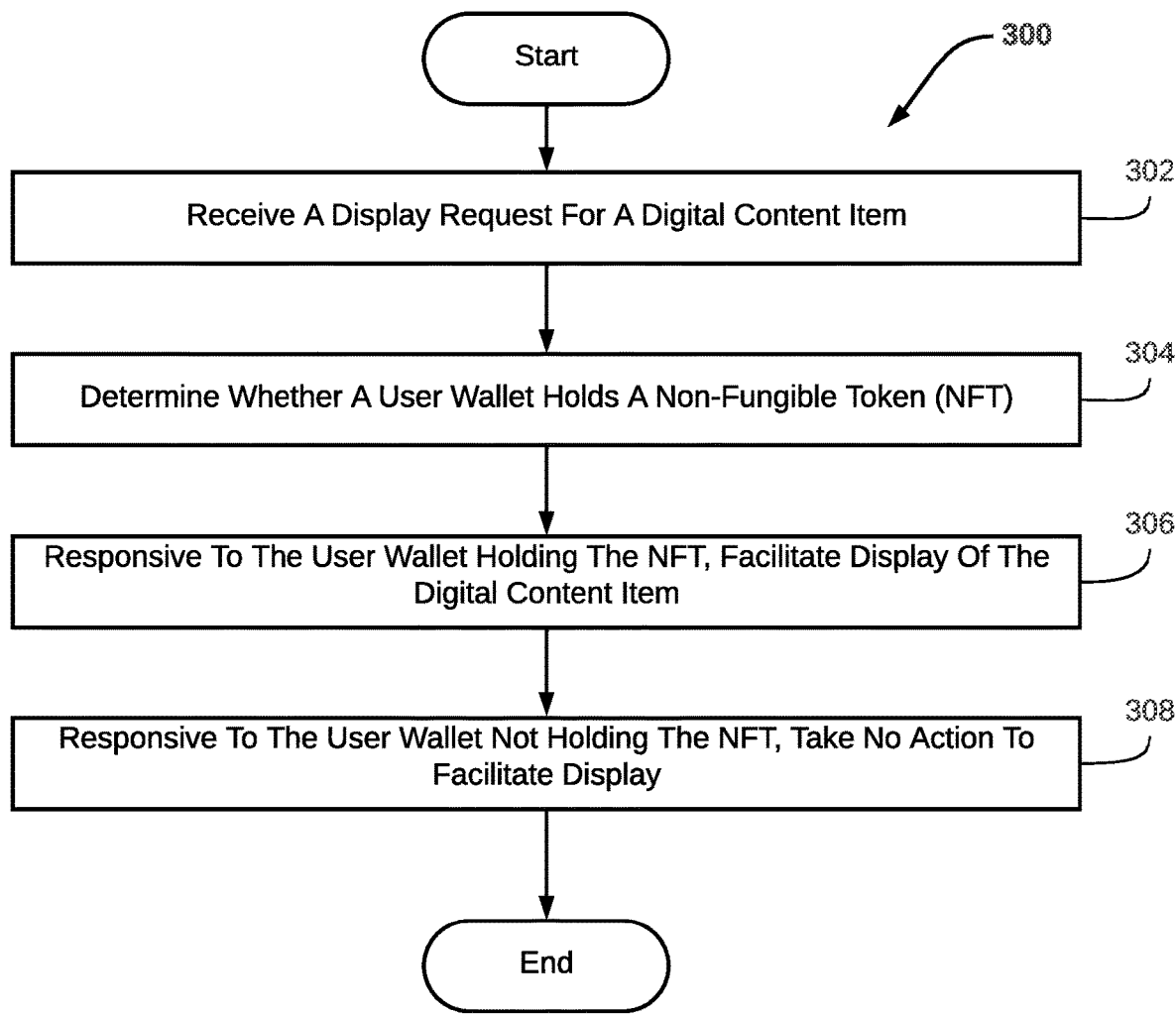
FIG. 3 illustrates a method to retrieve a digital content item to be displayed, in accordance with one or more implementations.

FIG. 3 illustrates a method 300 to retrieve a digital content item to be displayed on a wearable device, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include receiving a display request to display the digital content item on a wearable device. The display request may indicate the specific digital content item, a user associated with the wearable device, and/or other information. Operation 302 may be performed by a receipt component that is same as or similar to receipt component 114 (shown in FIG. 1 and described herein).

An operation 304 may include, responsive to receiving the display request, determining whether a user wallet for a decentralized ledger holds a non-fungible token associated with the specific digital content item. The user wallet being associated with the user. Operation 304 may be performed by a verification component that is same as or similar to verification component 116 (shown in FIG. 1 and described herein).

An operation 306 may include, responsive to the user wallet holding the non-fungible token associated with the digital content item, facilitating display of the digital content item on the wearable device. Facilitating display of the digital content item may include initiating transmission of information to the device that causes the wearable device to display the digital content item. Operation 306 may be performed by a display component that is same as or similar to display component 118 (shown in FIG. 1 and described herein).

An operation 308 may include, responsive to the user wallet not holding the non-fungible token associated with the digital content item, taking no further action to facilitate display of the digital content item on the wearable device such that the digital content item is not displayed on the wearable device. Operation 308 may be performed by a display component that is same as or similar to display component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed:

1. A system configured to track display of a digital content item and distribute rewards based on the display, the system comprising:
   one or more physical processors configured by machine-readable instruction to:
      receive, by a user via a client computing platform associated with the user, a display request identifying the digital content item and a wearable device associated with the user, wherein the digital content item is configured to be displayed on the wearable device, such that a first display request identifies a first digital content item and a first wearable device associated with a first user;
      effectuate, responsive to receipt of the display request, display of the digital content item on the wearable device associated with the user, such that the first digital content item is displayed on the first wearable device;
      receive, in an ongoing manner during the display of the digital content item, display information associated with the display of the digital content item on the wearable device, wherein the display information characterizes the nature of the display of the digital content item on the wearable device, such that first display information is associated with the display of the first digital content item on the first wearable device;
      determine and distribute, in an ongoing manner during the display of the digital content item, rewards to the user in accordance with the display information, wherein the determination of rewards is based on a reward scheme, wherein the reward scheme is associated with at least one of the digital content item or the user, wherein the reward scheme indicates rewards to be based on the nature of the display of the digital content item on the wearable device, such that a first reward scheme indicates a first reward to be distributed to the first user subsequent to display of the first digital content item on the first wearable device satisfying a first condition, wherein distributing the first reward to the first user includes transferring a first amount of consideration to an address on a decentralized ledger accessible by the first user.

2. The system of claim 1, wherein determination and distribution of rewards is executed by a smart contract stored on the decentralized ledger, wherein the smart contract is associated with at least one of the digital content item or the user, and wherein the display information is provided to the smart contract.

3. The system of claim 1, wherein the nature of the display of the digital content item on the wearable device is based on at least one of a duration of time that the digital content item is displayed, a geographical location of the wearable device during display of the digital content item, and observer interaction with the digital content item via the wearable device.

4. The system of claim 3, wherein the first condition identifies a threshold for at least one of a duration of time that the digital content item is displayed, a geographical location of the wearable device during display of the digital content item, and observer interaction with the digital content item via the wearable device.

5. The system of claim 1, wherein rewards are determined and distributed to the user subsequent to termination of display of the digital content item.

6. The system of claim 1, wherein the wearable device is a physical wearable device or a virtual wearable device within a virtual reality environment.

7. The system of claim 1, wherein the address on the decentralized ledger is accessible by the first user via a user wallet, wherein the user wallet is linked to an external wallet, wherein the user wallet retrieves funds from and deposits funds to the external wallet, and wherein the external wallet allows the user to manage funds on a public decentralized ledger.

8. The system of claim 1, wherein the distribution of rewards includes a transfer of consideration to an address on a decentralized ledger that corresponds to a user wallet associated with the user.

9. The system of claim 1, wherein display information includes at least one of a duration of time that the digital content item is displayed, a geographical location of the wearable device during display of the digital content item, and observer interaction with the digital content item via the wearable device.

10. The system of claim 1, wherein the wearable device is a head mounted device configured to present displays of an augmented reality or virtual reality environment to a wearer of the head mounted device.

11. A method for tracking display of a digital content item and distributing rewards based on the display, the method comprising:

receiving, by a user via a client computing platform associated with the user, a display request identifying the digital content item and a wearable device associated with the user, wherein the digital content item is configured to be displayed on the wearable device, including receiving a first display request that identifies a first digital content item and a first wearable device associated with a first user;

effectuating, responsive to receipt of the display request, display of the digital content item on the wearable device associated with the user, including effectuating display of the first digital content item on the first wearable device;

receiving, in an ongoing manner during the display of the digital content item, display information associated with the display of the digital content item on the wearable device, wherein the display information characterizes the nature of the display of the digital content item on the wearable device, including receiving first display information associated with the display of the first digital content item on the first wearable device;

determining and distributing, in an ongoing manner during the display of the digital content item, rewards to the user in accordance with the display information, wherein the determination of rewards is based on a reward scheme, wherein the reward scheme is associated with at least one of the digital content item or the user, wherein the reward scheme indicates rewards to be based on the nature of the display of the digital content item on the wearable device, and wherein a first reward scheme indicates a first reward to be distributed to the first user subsequent to display of the first digital content item on the first wearable device satisfying a first condition, wherein distributing the first reward to the first user includes transferring a first amount of consideration to an address on a decentralized ledger accessible by the first user.

12. The method of claim 11, wherein determination and distribution of rewards is executed by a smart contract stored on the decentralized ledger, wherein the smart contract is associated with at least one of the digital content item or the user, and wherein the display information is provided to the smart contract.

13. The method of claim 11, wherein the nature of the display of the digital content item on the wearable device is based on at least one of a duration of time that the digital content item is displayed, a geographical location of the wearable device during display of the digital content item, and observer interaction with the digital content item via the wearable device.

14. The method of claim 13, wherein the first condition identifies a threshold for at least one of a duration of time that the digital content item is displayed, a geographical location of the wearable device during display of the digital content item, and observer interaction with the digital content item via the wearable device.

15. The method of claim 11, wherein rewards are determined and distributed to the user subsequent to termination of display of the digital content item.

16. The method of claim 11, wherein the wearable device is a physical wearable device or a virtual wearable device within a virtual reality environment.

17. The method of claim 11, wherein the address on the decentralized ledger is accessible by the first user via a user wallet, wherein the user wallet is linked to an external wallet, wherein the user wallet retrieves funds from and deposits funds to the external wallet, and wherein the external wallet allows the user to manage funds on a public decentralized ledger.

18. The method of claim 11, wherein the distribution of rewards includes a transfer of consideration to an address on a decentralized ledger that corresponds to a user wallet associated with the user.

19. The method of claim 11, wherein display information includes at least one of a duration of time that the digital content item is displayed, a geographical location of the wearable device during display of the digital content item, and observer interaction with the digital content item via the wearable device.

20. The method of claim 11, wherein the wearable device is a head mounted device configured present displays of an augmented reality or virtual reality environment to a wearer of the head mounted device.

* * * * *